United States Patent
Aron et al.

(10) Patent No.: US 9,613,119 B1
(45) Date of Patent: Apr. 4, 2017

(54) UNIQUE IDENTIFIERS FOR DATA REPLICATION, MIGRATION, FAILOVER OPERATIONS AND FAILBACK OPERATIONS

(71) Applicant: Nutanix, Inc., San Jose, CA (US)

(72) Inventors: Mohit Aron, Los Altos, CA (US); Brian Byrne, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 260 days.

(21) Appl. No.: 14/143,762

(22) Filed: Dec. 30, 2013

Related U.S. Application Data

(60) Provisional application No. 61/785,314, filed on Mar. 14, 2013.

(51) Int. Cl.
*G06F 17/30* (2006.01)

(52) U.S. Cl.
CPC ............... *G06F 17/30575* (2013.01)

(58) Field of Classification Search
None
See application file for complete search history.

(56) References Cited

U.S. PATENT DOCUMENTS

| | | | | |
|---|---|---|---|---|
| 5,469,562 A | * | 11/1995 | Saether | G06F 11/1474 711/100 |
| 5,778,201 A | * | 7/1998 | Scalise | G06F 13/4286 710/305 |
| 7,584,226 B2 | | 9/2009 | Fatula, Jr. | |
| 7,586,953 B2 | | 9/2009 | Forest | |
| 8,850,130 B1 | | 9/2014 | Aron et al. | |
| 2004/0003111 A1 | | 1/2004 | Maeda | |
| 2005/0034033 A1 | | 2/2005 | Nemawarkar | |
| 2005/0114386 A1 | | 5/2005 | Nassor | |
| 2007/0038687 A1 | * | 2/2007 | Carroll | G06F 17/30073 |
| 2008/0021972 A1 | * | 1/2008 | Huelskamp | A61B 5/0031 709/211 |
| 2009/0059842 A1 | | 3/2009 | Maltseff | |
| 2012/0017096 A1 | * | 1/2012 | Snider | G06F 11/1453 713/189 |
| 2012/0036161 A1 | | 2/2012 | Lacapra | |
| 2012/0078855 A1 | | 3/2012 | Beatty | |
| 2012/0143887 A1 | | 6/2012 | Fontenot | |
| 2012/0259912 A1 | | 10/2012 | Kruse | |
| 2013/0185258 A1 | * | 7/2013 | Bestler | G06F 17/30197 707/638 |

(Continued)

OTHER PUBLICATIONS

Final Office Action dated May 24, 2016 for related U.S. Appl. No. 14/145,290.

(Continued)

*Primary Examiner* — Wilson Lee
(74) *Attorney, Agent, or Firm* — Vista IP Law Group, LLP

(57) ABSTRACT

A computer implemented method implemented with a processor for assigning a unique identifier for a data item initially deployed at a node of a networked environment includes determining a unique node identifier for the node of the networked environment, atomically modifying a local counter value at the node of the networked environment, and appending the unique node identifier to the atomically modified local counter value at the node of the networked environment to form a unique ID for the data item.

20 Claims, 10 Drawing Sheets

(56) References Cited

U.S. PATENT DOCUMENTS

| | | | | |
|---|---|---|---|---|
| 2013/0217332 A1* | 8/2013 | Altman | ............... | H04H 60/90 |
| | | | | 455/41.2 |
| 2013/0217333 A1* | 8/2013 | Sprigg | ............... | H04W 4/008 |
| | | | | 455/41.2 |
| 2013/0297422 A1* | 11/2013 | Hunter | ............... | G06Q 30/0261 |
| | | | | 705/14.58 |
| 2013/0339567 A1 | 12/2013 | Carpentier | | |
| 2014/0133656 A1* | 5/2014 | Wurster | ............... | H04L 9/0637 |
| | | | | 380/270 |

OTHER PUBLICATIONS

Advisory Action dated Aug. 4, 2016 for related U.S. Appl. No. 14/145,290.

Non-final Office Action dated Oct. 15, 2015 for related U.S. Appl. No. 14/145,290.

Non-final Office Action dated Feb. 10, 2017 for related U.S. Appl. No. 14/145,290.

* cited by examiner

US 9,613,119 B1

UNIQUE IDENTIFIERS FOR DATA REPLICATION, MIGRATION, FAILOVER OPERATIONS AND FAILBACK OPERATIONS

CROSS-REFERENCE TO RELATED APPLICATIONS

This present application claims the benefit of U.S. Provisional Application No. 61/785,314, filed Mar. 14, 2013, which is hereby incorporated by reference in its entirety.

FIELD

This disclosure concerns unique identifiers for data replication, data migration, failover operations and failback operations.

BACKGROUND

In a networked environment of nodes (e.g., servers, data centers, etc.), data may be replicated on multiple nodes in order to support data migration and disaster recovery (e.g., failover and failback operations). Under many different circumstances, data stored at different nodes may need to be compared in order to support replication, replication or disaster recovery. A popular technique for comparing data involves fingerprinting. Fingerprinting refers to a technique where a fingerprinting algorithm is performed on data to map the data into a shorter fingerprint (e.g., bit string) that identifies the data. Multiple pieces of data may be compared by first generating fingerprints for those multiple pieces of data and then comparing their fingerprints.

While fingerprinting allows for pieces of data to be compared without having to compare each individual segment making up a piece of data, fingerprinting is still resource and computation intensive. For example, where a piece of data is very large, performing a fingerprinting algorithm on the piece of data may require numerous computations. Likewise, when several pieces of data are being compared at once, the fingerprinting and comparison process may utilize significant resources and take an extensive amount of time to complete. Additionally, fingerprinting cannot guarantee non-collisions (i.e., malicious generation of different pieces of data with same fingerprint), which makes this technique subject to security attacks.

Therefore, there is a need for an improved approach to uniquely identify data in a networked environment for purposes of data replication, data migration and disaster recovery.

SUMMARY

Some embodiments of the present invention are directed to a method for assigning a unique identifier for a data item initially deployed at a node of a networked environment that includes determining a unique node identifier for the node of the networked environment, atomically modifying a local counter value at the node of the networked environment, and appending the unique node identifier to the atomically modified local counter value at the node of the networked environment to form a unique ID for the data item.

Further details of aspects, objects, and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Figure 1:
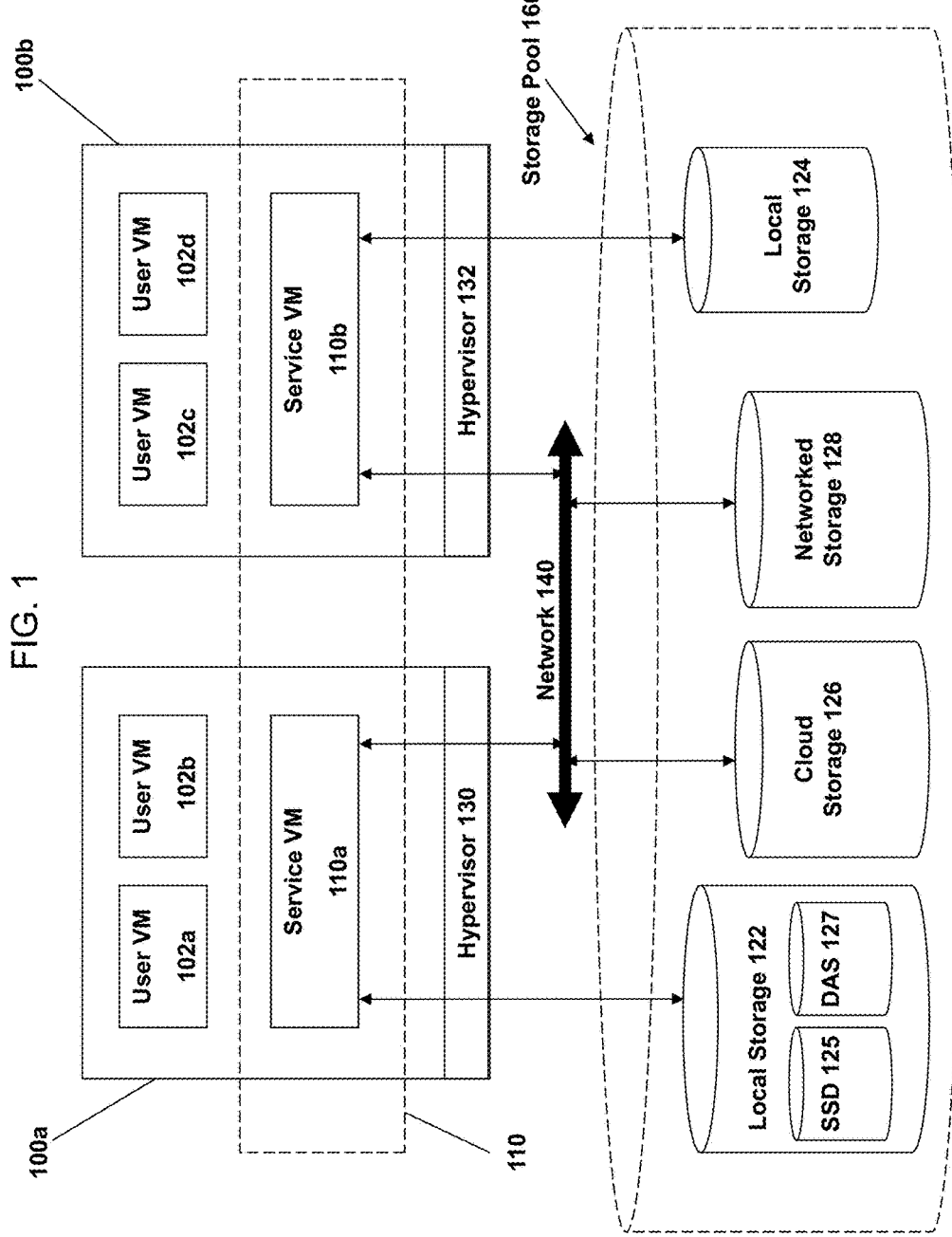
FIG. 1 is an example of a networked environment where data may be replicated at different nodes of the environment.

In a networked environment of nodes (e.g., servers, data centers, etc.), data may be replicated on multiple nodes in order to support data migration or disaster recovery (e.g., failover and failback operations). FIG. 1 is an example of a networked environment where data may be replicated at different nodes of the environment. However, it is important to note that the methods described below may be implemented in any networked environment and are not limited to being implemented in the networked environment described in FIG. 1.

FIG. 1 illustrates an architecture for implementing storage management in a virtualization environment according to some embodiments of the invention. The architecture of FIG. 1 can be implemented for a distributed platform that contains multiple servers 100a and 100b that manages multiple-tiers of storage. Like the prior art, the multiple tiers of storage includes storage that is accessible through a network 140, such as cloud storage 126 or networked storage 128 (e.g., a SAN or "storage area network"). Unlike the prior art, the present embodiment also permits management of local storage 122/124 that is within or directly attached to the server and/or appliance. Examples of such storage include SSDs 125 ("Solid State Drives") or HDDs ("hard disk drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as the ESX product available from VMWare. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Service VM". The term "Service VM" may also be referred to as the "Controller VM", and these terms may be used interchangeably throughout the remainder of the description. The Service VMs 110a/110b are not formed as part of specific implementations of hypervisors 130/132. Instead, the Service VMs run as virtual machines in the hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Yet another advantage of the present embodiment of the invention is that storage-related optimizations for access and storage of data can be implemented directly within the primary storage path. For example, in some embodiments of the invention, the Service VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QoS) functions, encryption, and compression. The new architecture massively parallelizes storage, by placing a storage controller—in the form of a Service VM—at each hypervisor, and thus makes it possible to render enough CPU and memory resources to achieve the aforementioned optimizations.

In the virtualization environment of FIG. 1, data items may be replicated at different nodes 100a, 100b in order to facilitate data migration or disaster recovery. For example, a data item associated with node 100a may be replicated at node 100b, such that if node 100a fails, node 100b may be used for servicing particular interactions requiring access to the data item. The virtualization environment of FIG. 1 may be extended to support additional nodes, such that data items may be replicated at some of the nodes, but not all of the nodes depending on particular characteristics of the environment. For example, data items may be replicated at nodes in close physical proximity to the node where the data item originated.

While FIG. 1 illustrates a particular example of a networked environment where embodiments of the present invention may be practiced, it is important to note that embodiments of the present invention may be practiced in any networked environment where data may be replicated at different nodes.

Under many different circumstances, data items stored at different nodes may need to be compared in order to support replication, migration or disaster recovery. A popular technique for comparing data items involves fingerprinting. Fingerprinting refers to a technique where a fingerprinting algorithm is performed on a data item to map the data item into a shorter fingerprint (e.g., bit string) that identifies the data item. Multiple data items may be compared by first generating fingerprints for those multiple data items and then comparing their fingerprints. One technique for fingerprinting is known as "Rabin fingerprinting". Rabin fingerprinting is a known algorithm for objectively dividing data into consistent portions. This algorithm creates uniform and common boundaries for data portions that are partitioned out of larger items of data. A SHA1 algorithm may then be applied to the data portion created by Rabin fingerprinting to create a unique signature for that data portion. Additional details regarding Rabin fingerprinting may be found in co-pending application Ser. No. 13/207,357, which is herein incorporated by reference in its entirety.

While fingerprinting allows for data to be compared without having to compare each individual segment making up a data item, fingerprinting is still resource and computation intensive. For example, where a data item is very large, performing a fingerprinting algorithm on the data item may require numerous computations. Likewise, when several data items are being compared at once, the fingerprinting and comparison process may utilize significant resources and take an extensive amount of time to complete.

The issues associated with fingerprinting may be compounded by the way replicated data is distributed in a networked environment or the way data is migrated in a networked environment. Often times an origin node where a data item is first deployed decides to replicate the data item on one or more replica nodes within the networked environment or to migrate the data item to another node within the networked environment. As used herein, the term replica node refers to a node having a replicated instance of a data item, whereas the term origin node refers to a node where a data item is initially deployed.

A replica node may itself decide to further replicate the replicated instance of the data item on additional replica nodes, with this process continuing over several different sets of additional replica nodes. Because the additional replica nodes may not have access to a mapping of the replication path traversed by the data item that allows them to identify other nodes within the networked environment having the same data item, they may be unable to quickly determine where else the same data item resides. In such circumstances, the nodes must perform fingerprinting of all their data items and subsequently compare those fingerprints to determine where the same data item resides within the network. Likewise, where a data item is being migrated to another node in the networked environment, the data items residing at the other node may need to be compared to the data item being migrated to determine whether the data item to be migrated already exists on the other node.

Because of the resource and computation intensive nature of fingerprinting, such a process may take an extensive amount of time, leading to several inefficiencies, especially when attempting to perform disaster recovery.

By instead assigning instances of data items with unique identifiers such that all instances of an identical data item across the networked environment share the same unique identifier, the efficiency of data replication, data migration and disaster recovery may be greatly improved.

In order to assign instances of data items with unique identifiers, each node in the networked environment must be capable of being identified by a unique node identifier and each node must track data items initially deployed at that node.

For a networked environment comprising a plurality of nodes, each node in the networked environment is first provided a unique node identifier. The networked environment may keep a global counter, such that whenever a new node is introduced into the networked environment it receives a unique node identifier based at least in part on the current value of the global counter. For example, a networked environment that initially includes a current global counter value of three may have three nodes uniquely identified as A, B and C. The networked environment may atomically modify (e.g., increment) its current global counter value to four when a new node is introduced into the networked environment and assign the new node with the unique identifier of D. The global counter value of the networked environment is atomically modified such that any node residing in the networked environment will not have the same unique node identifier.

Likewise, each node in the networked environment may keep a local counter for each data item being initially deployed at that node. Whenever a data item is initially deployed at a node, the local counter value for that node is atomically modified (e.g. incremented) such no data items being initially deployed at the node will be associated with the same local counter value. As used herein, the term initially deployed refers to the first instance of a data item being stored. Thus, a first instance of a data item created at node is initially deployed at that node. However, a subsequent instance of a data item replicated at another node is not initially deployed at the other node.

Figure 2:
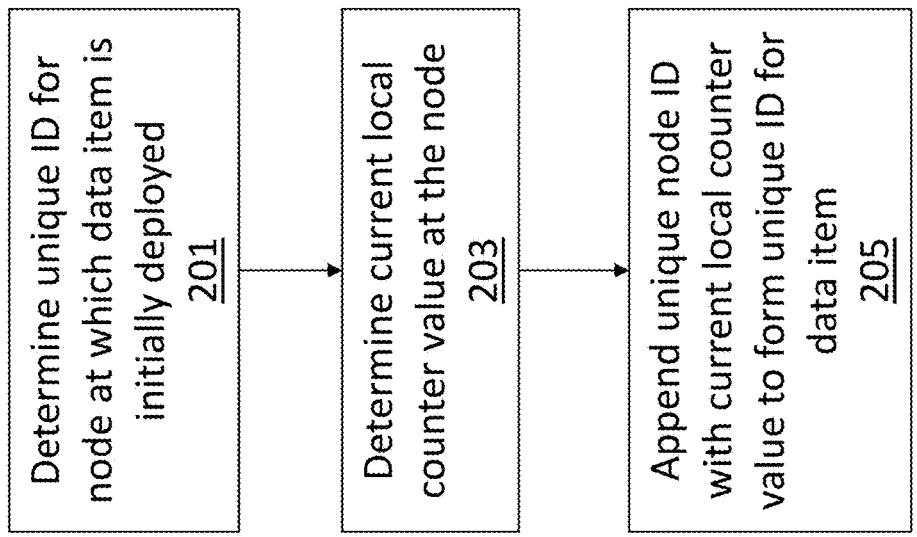
FIG. 2 illustrates a method for assigning unique identifiers for data items initially deployed at a node in a networked environment in accordance with some embodiments

FIG. 2 illustrates a method for assigning unique identifiers for data items initially deployed at a node in a networked environment in accordance with some embodiments. The method of FIG. 2 utilizes a unique node identifier for each node within the networked environment and a local counter for each node within the networked environment.

When a data item is to be initially deployed (e.g., stored) at a node, the unique ID for the node at which the data item is to be initially deployed is determined as shown at 201. Determining the unique ID for the node at which the piece of data is to be initially deployed may simply involve querying the node for its unique node identifier. For example, a data item to be initially deployed at a node with a unique node identifier of A will result in a determination that the unique node identifier is A.

In some embodiments the unique node identifier may be a 64-bit value. In other embodiments, the unique node identifier may be of a different data size. The size of the unique node identifier may be chosen such that the networked environment can support the assignment of a unique node identifier for any number of nodes.

The local counter value for the node at which the data item is to be initially deployed is then atomically modified as shown at 203. As mentioned above, each node may keep a local counter which is atomically modified (e.g. incremented) each time a data item is initially deployed at that node. For example, a local counter for a node in the networked environment may be incremented to a value of 50 upon the deployment of a first instance of a data item at that node. In that example, the local counter value determined for that piece of data would be 50.

In some embodiments the local counter value may be a 64-bit value. In other embodiments, the local counter value may be of a different data size. The size of the local counter value may be chosen such that the networked environment can support the assignment of a unique local counter value for any number of data items being initially deployed at a node.

Once the unique node identifier has been determined and the local counter value has been atomically modified for the data item being initially deployed at the node, the unique node identifier and the modified local counter value may be appended to form a unique ID for the data item as shown at 205. Because each node within the networked environment has its own unique node identifier and each node within the networked environment maintains its own local counter that is atomically modified upon the initial deployment of any data item, every deployment of a first instance of a data item will be assigned a unique identifier that is absolutely unique to the entire networked environment.

Once a unique ID has been assigned to a first instance of a data item, any other replicated instance of that data item is given the same unique ID. In order to ensure that any replicated instance of a data item will be identical to the first instance of that data item, once a unique ID is assigned to a data item, the data item becomes immutable. Anytime a data item is modified, the modified data item is treated as a first instance and assigned a different unique ID. In this way, every instance of a data item having the same unique ID within the networked environment will be identical.

In some embodiments, where the unique node identifier is a 64-bit value and the local counter value is a 64-bit value, the unique ID may be a 128-bit value. In other embodiments, the unique ID may be of a different data size. The size of the unique ID for instances of a data item may be chosen such that the networked environment can support the assignment of a unique ID for any number of data items being initially deployed at a node.

By utilizing a unique ID for every unique data item within a networked environment, data replication, data migration and disaster recovery may be made more efficient. Rather than having to fingerprint data items before performing comparisons, unique ID values can be simply extracted from data items and compared against each other, leading to a reduction in the number of computations involved and resources consumed for data replication, data migration and disaster recovery.

Figure 3:
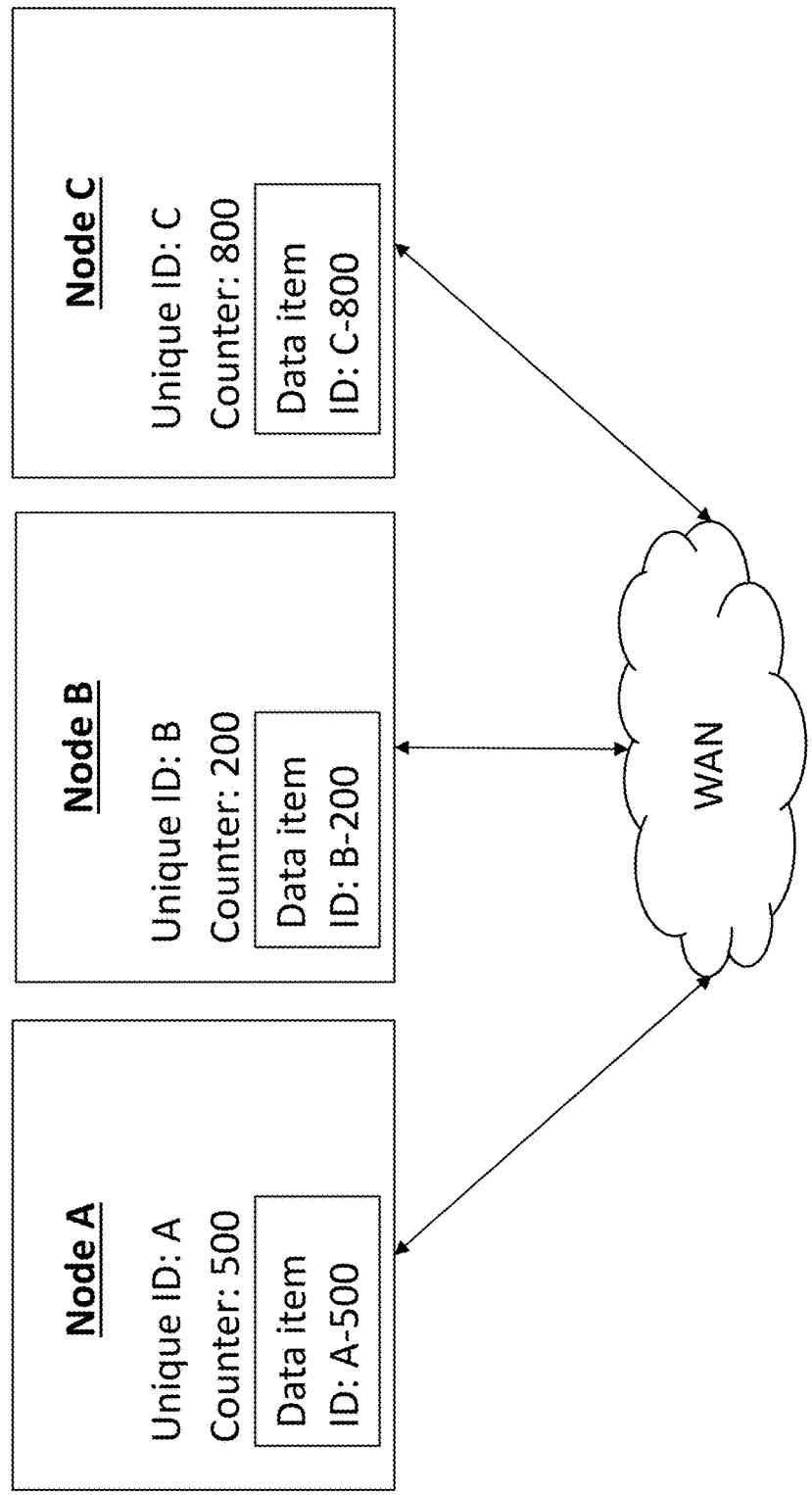
FIG. 3 is a schematic diagram illustrating the assignment of unique identifiers for data items initially deployed at nodes in a networked environment in accordance with some embodiments.

FIG. 3 is a schematic diagram illustrating the assignment of unique identifiers for data items initially deployed at nodes in a networked environment in accordance with some embodiments. The networked environment of FIG. 3 includes three nodes A, B, and C connected by way of a wide area network (WAN). As mentioned above, each node is assigned a unique node identifier and each node includes a local counter whose value is atomically modified (e.g., incremented) upon the initial deployment of a data item at that node.

Node A is assigned the unique node identifier A. When a first instance of a data item is initially deployed at node A, the local counter value for node A is atomically modified (e.g., incremented) to 500. The first instance of the data item being initially deployed at node A is then given a unique ID by appending the unique node ID for node A to the current local counter value at node A. The unique ID is thus A-500 for the data item being initially deployed at node A.

Node B is assigned the unique node identifier B. When a first instance of a data item is initially deployed at node B, the local counter value for node B is atomically modified (e.g., incremented) to 200. The first instance of the data item being initially deployed at node B is then given a unique ID by appending the unique node ID for node B to the current local counter value at node B. The unique ID is thus B-200 for the data item being initially deployed at node B.

Node C is assigned the unique node identifier C. When a first instance of a data item is initially deployed at node C, the local counter value for node C is atomically modified (e.g., incremented) to 800. The first instance of the data item being initially deployed at node C is then given a unique ID by appending the unique node ID for node C to the current local counter value at node C. The unique ID is thus C-500 for the data item being initially deployed at node C.

Utilizing unique IDs for every unique data item within a networked environment, allows for data replication/migration to be made more efficient by reducing the amount of redundant replications being made. Unique IDs allow for a redundancy check to be quickly performed before creating a replicate instance of a data item at a replica node or migrating a data item to another node. Before a node having an instance of a data item decides to further replicate that data item at a replica node or migrate the data item to another node, it may compare the unique ID of its instance of the data item against the unique IDs of data item instances stored at the replica node or other node to see if an instance of that data item already exists at the other node.

Figure 4:
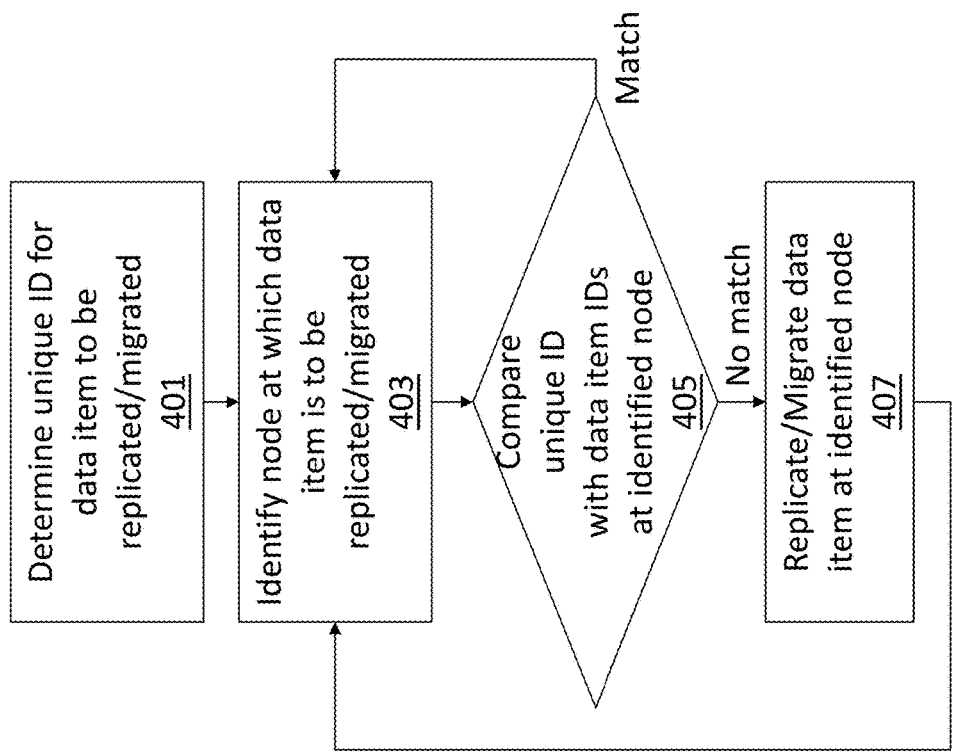
FIG. 4 is a flowchart illustrating a method for performing a redundancy check on an instance of a data item to be replicated using a unique ID in accordance with some embodiments.

FIG. 4 is a flowchart illustrating a method for performing a redundancy check on an instance of a data item to be replicated or migrated using a unique ID in accordance with some embodiments.

For a data item residing at a node that is to be replicated or migrated at one or more other nodes, a unique ID for that data item is first determined as shown at 401. In some embodiments, the data item to be replicated or migrated may be a first instance of the data item. In some other embodiments, the data item to be replicated or migrated may be a subsequent instance of the data item. Regardless of whether the data item to be replicated or migrated is a first instance of the data item or a subsequent instance of the data item, the instance of the data item to be replicated or migrated will have a unique ID that identifies every instance for that identical data item.

A node at which the data item is to be replicated or migrated is then identified as shown at 403.

The unique ID for the data item to be replicated or migrated is then compared to a list of unique IDs for data item instances residing at the identified node as shown at 405. The unique ID for the data item to be replicated or migrated may be easily identified as no fingerprinting algorithm needs to be performed to determine the unique ID. Likewise the unique IDs for data item instances residing at the identified node may also be easily identified as no fingerprinting algorithms need to be performed to determining the unique IDs. This is in contrast to the conventional fingerprinting approach which requires first performing a fingerprinting algorithm on the data item to be replicated, and then performing several other fingerprinting algorithms on all the instances of data on the identified node prior to comparison.

If a match is found at the identified node, then the data item is not replicated on or migrated to that node because a replicated instance of that data item already exists on the identified node. The method then returns to 403, where another node is identified at which the data item is to be replicated or migrated. The process continues until there are no additional nodes identified for which the data item is to be replicated or migrated.

If a match is not found at the identified node, then the data item is replicated or migrated on that node because a replicated instance of that data does not already exist on the identified node as shown at 407. The instance of data at the identified node will have the same unique ID as the instance of the data item that was replicated or migrated. This ensures that each identical instance of a data item within the networked environment will have the same unique ID. The method then returns to 403, where another node is identified at which the data item is to be replicated or migrated. The process continues until there are no additional nodes identified for which the data item is to be replicated or migrated.

Figure 5:
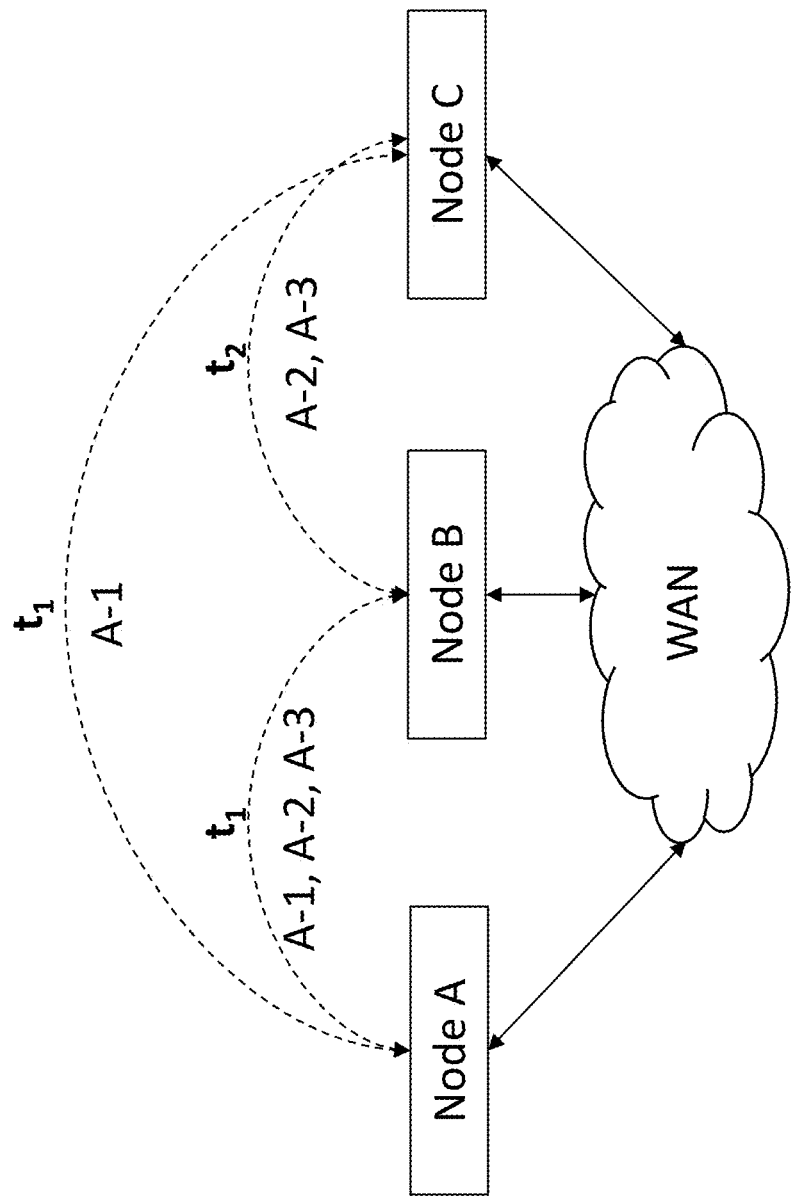
FIG. 5 is a schematic diagram illustrating a method for performing a redundancy check on a data item to be replicated using a unique ID in accordance with some embodiments.

FIG. 5 is a schematic diagram illustrating a method for performing a redundancy check on a data item to be replicated or migrated using a unique ID in accordance with some embodiments. The networked environment of FIG. 5 includes three nodes A, B, and C connected by way of a wide area network (WAN). As mentioned above, each node is assigned a unique node identifier and each node includes a local counter whose value is incremented upon the initial deployment of a piece of data at that node.

At a first time instance $t_1$, Node A replicates data having unique IDs A-1, A-2, and A-3 on node B and data having unique ID A-1 on node C. Prior to replicating data A-1 on node B, a redundancy check is performed wherein unique ID A-1 is compared to a list of unique IDs present at the node B to determine whether an instance of the data item having unique ID A-1 is already present at node B. Because the redundancy check reveals that an instance of the data item having unique ID A-1 is not currently present at node B, the data item having unique ID A-1 is replicated at node B. A similar redundancy check is performed prior to replicating or migrating data having unique IDs A-2 and A-3 on node B as well as replicating data having unique ID A-1 on node C.

At a second time instance $t_2$, Node B identifies node C for replicating or migrating data items having unique IDs A-1, A-2 and A-3. Prior to replicating or migrating data items having unique IDs A-1, A-2 and A-3 on node B, a redundancy check is performed on node C wherein unique IDs A-1, A-2 and A-3 are compared to a list of unique IDs present at the node C to determine whether instances of data items having unique IDs A-1, A-2 and A-3 are already present at node C. The redundancy check indicates that node C already includes an instance of the data item having unique ID A-1 from the previous replication at time instance $t_1$, and so node B does not replicate or migrate an instance of the data item having unique ID A-1 on node C at time instance $t_2$. The redundancy check also indicates that instances of data items having unique IDs A-2 and A-3 are not currently present at node C, and so node B replicates or migrates data items having unique IDs A-2 and A-3 on node C at time instance $t_2$.

By utilizing the unique IDs of instances of data items to perform redundancy checks prior to replication, redundant replication or migration of data items may be avoided. Additionally, the replication or migration process may be more efficiently performed by utilizing unique IDs to perform redundancy checks rather than having to perform fingerprinting algorithms prior to comparison.

Assigning identical instances of data items with the same unique IDs also allows for a more efficient approach for providing data recovery (e.g., failover and failback operations). Rather than having to perform fingerprinting between instances of data items residing at different nodes prior to executing data recovery, unique IDs may be used to quickly and efficiently compare instances of data items residing at different nodes prior to executing data recovery.

Figure 6:
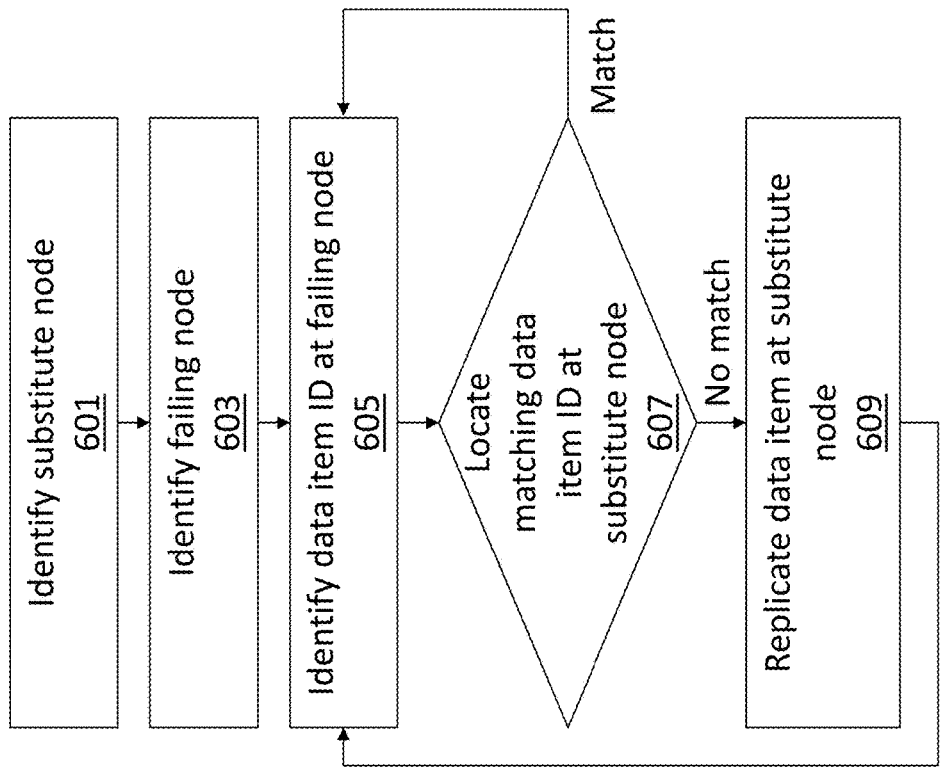
FIG. 6 is a flowchart illustrating a method for performing a failover operation using unique IDs for data in accordance with some embodiments

FIG. 6 is a flowchart illustrating a method for performing a failover operation using unique IDs for data in accordance with some embodiments. Failover occurs when a node in a networked environment designated as a primary node for servicing particular interactions fails and a substitute node in the networked environment replaces the failing node as the primary node for servicing those particular interactions. Before allowing the substitute node to service those particular interactions, the networked environment must ensure that the substitute node has instances of all the data items stored on the failing node prior to failure, such that consistency within the networked environment may be maintained.

When a failover operation is to occur, a substitute node is first identified as shown at 601. The networked system may utilize various mechanisms to identify a node to act as a substitute node. For example, the networked system may designate one or more nodes to act as substitute node whenever a particular node fails. Alternatively, the networked system may simply choose a node closest in physical proximity to the failing node to act as the substitute node.

The failing node is then identified as shown at 603. The networked environment may monitor all active nodes operating in the networked environment and notify all other nodes in the networked environment when a node fails. Once the failing node has been identified, a unique ID of a data item residing at the failing node may be identified as shown at 605. In some embodiments, the networked environment may keep a list that tracks all data items residing at a given node along with their unique IDs.

The networked system then attempts to locate a matching unique ID at the substitute node as shown at 607. The networked system may simply compare the unique ID of the data items residing at the failing node to a list of unique IDs for data items at the substitute node. If a match is found, the method then returns to 603, where another unique ID of another data item residing at the failing node is identified. This process continues until there are no unique IDs for data items residing at the failing node left to identify.

If a match is not found, then an instance of the data item residing at the failing node corresponding to the unique ID is replicated at the substitute node as shown at 609. The replicated instance of the data item at the substitute node will have the same unique ID as the instance of data residing at the failing node. The method then returns to 603, where another unique ID of another data item residing at the failing node is identified. This process continues until there are no unique IDs for data items residing at the failing node left to identify.

By utilizing the unique IDs of data items to perform a failover operation, instances of data items residing at a substitute node that are replicates of instances of data item residing at the failing node may be quickly identified. Only data items residing at the failing node having unique IDs that are not present at the substitute node are replicated on the substitute node. The ability to quickly check which data items are already replicated on a substitute node significantly improves the amount of time and resources needed to perform a failover operation.

Figure 7:
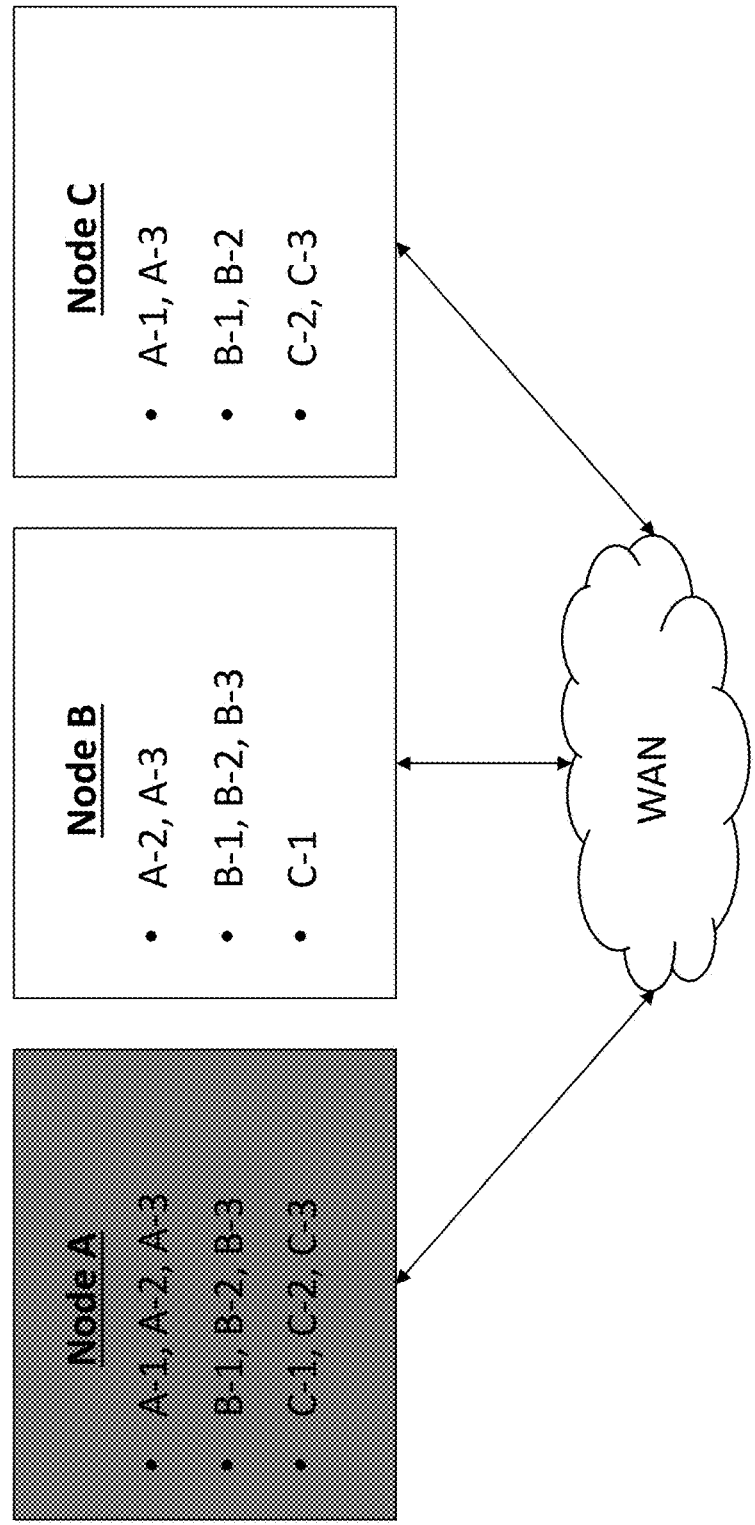
FIG. 7 is a schematic diagram illustrating a method for performing a failover operation using a unique ID in accordance with some embodiments

FIG. 7 is a schematic diagram illustrating a method for performing a failover operation using a unique ID in accordance with some embodiments. The networked environment of FIG. 7 includes three nodes A, B, and C connected by way of a wide area network (WAN). As mentioned above, each node is assigned a unique node identifier and each node includes a local counter whose value is incremented upon the initial deployment of a piece of data at that node.

In FIG. 7, node A fails and node C is identified as the substitute node for executing the failover operation. Once node A has been identified as the failing node, unique IDs of data items residing at the failing node A may be identified. Failing node A includes instances of data items having unique IDs A-1, A-2, A-3, B-1, B-2, B-3, C-1, C-2 and C-3.

For each data item residing at failing node A, an attempt to locate a matching unique ID at the substitute node C is made. Substitute node C includes instances of data items having matching unique IDs A-1, A-3, B-1, B-2, C-2, and C-3. Substitute node C does not include instances of data items having matching unique IDs A-2, B-3 and C-3. Therefore data items corresponding to the unique IDs A-2, B-3 and C-1 are replicated at the substitute node as shown at 609. The data items corresponding to unique IDs A-2, B-3 and C-1 may be replicated from any other node in the networked environment having instances of data items with unique IDs A-2, B-3 and C-1. For example, in FIG. 7, data items corresponding to unique IDs A-2, B-3 and C-1 may be replicated from node B which includes instances of data items having those unique IDs.

As mentioned above, by utilizing the unique IDs of data items to perform a failover operation, instances of data items residing at a substitute node that are replicates of instances of data items residing at the failing node may be quickly identified. Only instances of data items residing at the failing node having unique IDs that are not present at the substitute node are replicated on the substitute node. The ability to quickly check which data items are already replicated on a substitute node significantly improves the amount of time and resources needed to perform a failover operation.

Figure 8:
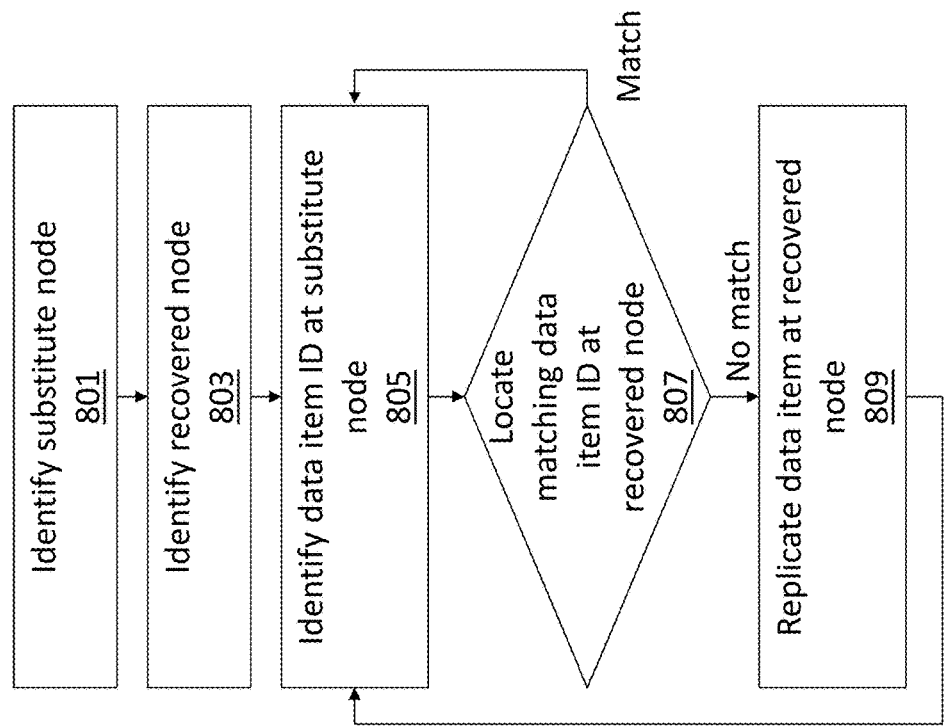
FIG. 8 is a flowchart illustrating a method for performing a failback operation using unique IDs for data in accordance with some embodiments.

FIG. 8 is a flowchart illustrating a method for performing a failback operation using unique IDs for data in accordance with some embodiments. Failback occurs when a node in a networked environment that previously failed and was replaced with a substitute node recovers and is again designated as the primary node for servicing particular interactions that were assigned to the substitute node during failover. Before allowing the recovered node to again be designated as the primary node and to service those particular interactions assigned to the substitute node during failover, the networked environment must ensure that the recovered node has instances of all the data items stored on the substitute node, such that consistency within the networked environment may be maintained.

When a failback operation is to occur, a substitute node is first identified as shown at 801. The substitute node is the node that replaced the failing node during the failover operation. The recovered node is then identified as shown at 803. The networked environment may keep track of failed nodes, substitute nodes, and recovered nodes to facilitate identification.

Between the completion of the failover operation and the execution of the failback operation, the substitute node may have created instances of new data items, deleted data items, or otherwise modified data items stored therein. As such, it is important for the networked environment to identify differences in data items stored on the recovered node and the substitute node prior to completing the failback operation and re-designating the recovered node as the primary node for servicing those interactions assigned to the substitute node during failover.

Once the substitute node and recovered node have been identified, a unique ID of a data item residing at the substitute node may be identified as shown at 805. In some embodiments, the networked environment may keep a list that tracks all data items residing at a given node along with their unique IDs.

The networked system then attempts to locate a matching unique ID at the recovered node as shown at 807. The networked system may simply compare the unique ID of the data item residing at the substitute node to a list of unique IDs for instances of data items at the recovered node. If a match is found, the method then returns to 805, where another unique ID of another data item residing at the substitute node is identified. This process continues until there are no unique IDs for data items residing at the substitute node left to identify.

If a match is not found, then an instance of the data item residing at the substitute node corresponding to the unique ID is replicated at the recovered node as shown at 809. The replicated instance of the data item at the recovered node will have the same unique ID as the instance of the data item residing at the substitute node. The method then returns to 805, where another unique ID of another data item residing at the substitute node is identified. This process continues until there are no unique IDs for data items residing at the substitute node left to identify.

By utilizing the unique IDs of instances of data to perform a failback operation, data items residing at a recovered node that are replicates of data items residing at the substitute node may be quickly identified. Only data items residing at the substitute node having unique IDs that are not present at the recovered node are replicated on the recovered node. The ability to quickly check which data items are already replicated on a recovered node significantly improves the amount of time and resources needed to perform a failback operation.

Figure 9:
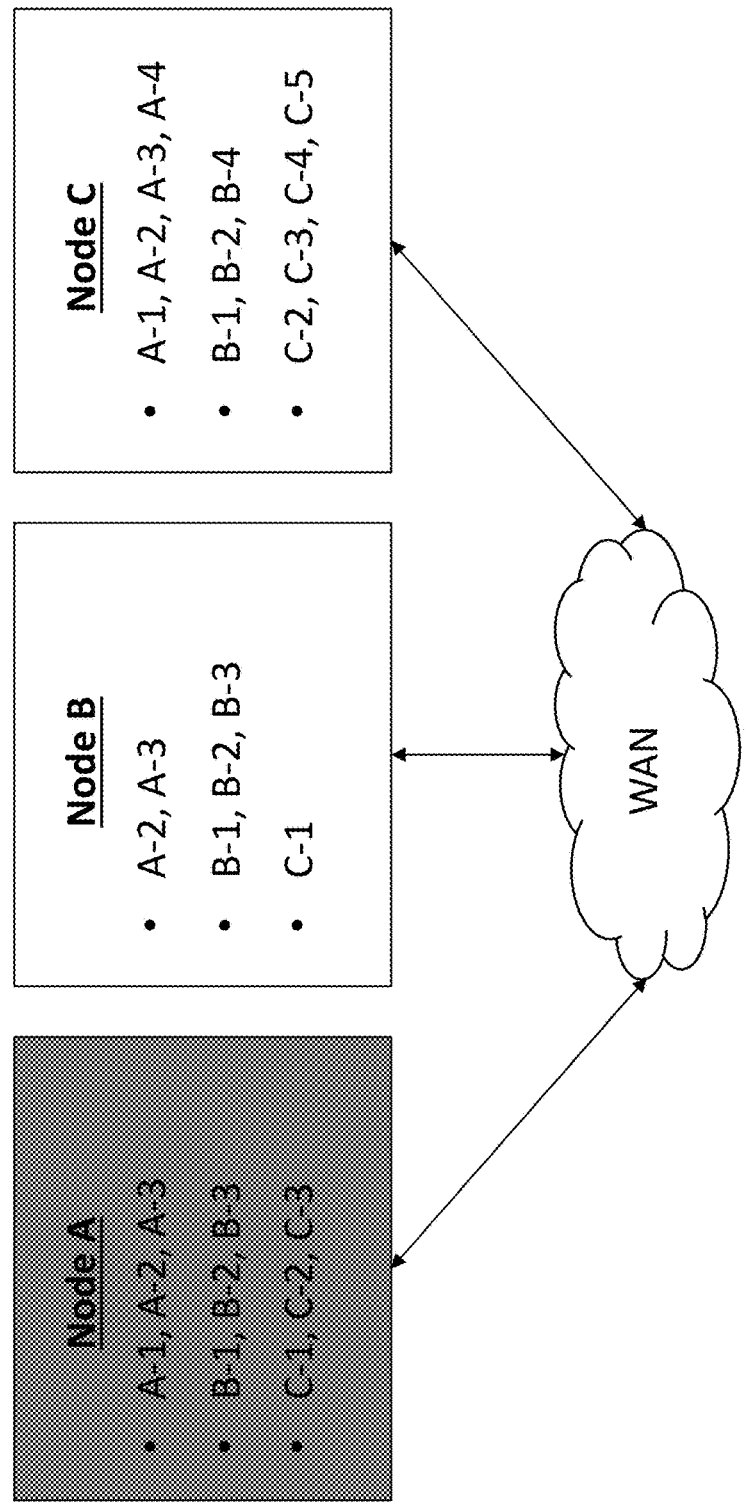
FIG. 9 is a schematic diagram illustrating a method for performing a failback operation using a unique ID in accordance with some embodiments

FIG. 9 is a schematic diagram illustrating a method for performing a failback operation using a unique ID in accordance with some embodiments. The networked environment of FIG. 9 includes three nodes A, B, and C connected by way of a wide area network (WAN). As mentioned above, each node is assigned a unique node identifier and each node includes a local counter whose value is incremented upon the initial deployment of a piece of data at that node.

In FIG. 9, node A recovers after previously failing and being replaced with substitute node C. Prior to again designating node A as the primary node for servicing particular interactions that was assigned to substitute node C during failover, the networked environment must ensure that recovered node A has all the data items stored on substitute node C, such that consistency within the networked environment may be maintained.

Once node A has been identified as the recovered node and node C has been identified as the substitute node, unique IDs of data items residing at substitute node C may be identified. Substitute node C includes instances of data items having unique IDs A-1, A-2, A-3, A-4, B-1, B-2, B-4, C-2, C-3, C-4 and C-5.

For each data item residing at substitute node C, an attempt to locate a matching unique ID at the recovered node A is made. Recovered node A includes instances of data items having matching unique IDs A-1, A-2, A-3, B-1, B-2, C-2, and C-3. Recovered node A does not include instances of data items having matching unique IDs A-4, B-4, C-4 and C-5. Therefore instances of data items corresponding to the unique IDs A-4, B-4, C-4 and C-5 are replicated at the recovered node. Recovered node A may be missing instances of data items corresponding to the unique IDs A-4, B-4, C-4 and C-5 because those data items were newly created at substitute node C during the period of time that recovered node A was down (e.g., between completion of the failover operation and initialization of the failback operation).

As mentioned above, by utilizing the unique IDs of data items to perform a failback operation, instances of data items residing at a recovered node that are replicates of instances of data items residing at the substitute node may be quickly identified. Only data items residing at the substitute node having unique IDs that are not present at the recovered node are replicated on the recovered node. The ability to quickly check which data items are already replicated on a recovered node significantly improves the amount of time and resources needed to perform a failback operation.

System Architecture

Figure 10:
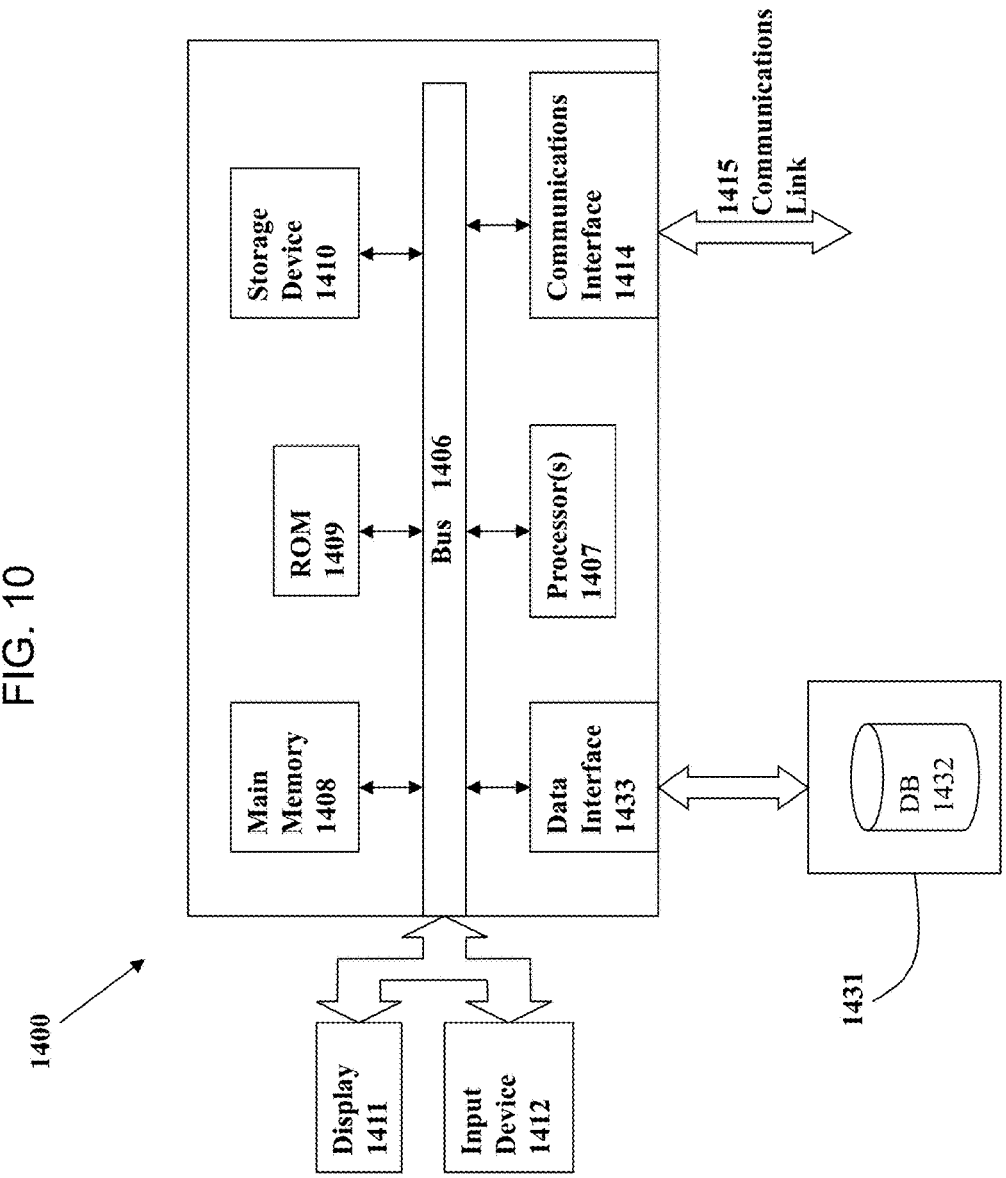
FIG. 10 is a block diagram of an illustrative computing system 1400 suitable for implementing an embodiment of the present invention.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for performing a redundancy check for a data item residing at a first node to be replicated or migrated in a networked environment, comprising:
    determining a unique ID for the data item;
    identifying a second node in the networked environment where the data item is to be replicated or migrated;
    comparing the unique ID for the data item to be replicated or migrated with a list of unique IDs residing at the second node;
    replicating or migrating the data item at the second node if the unique ID for the data item is not in the list of unique IDs residing at the second node; and
    wherein the unique ID is assigned to a first instance of the data item by:
        determining a unique node identifier for a node of the networked environment where the first instance of the data item is deployed,
        atomically modifying a local counter value at the node of the networked environment where the first instance of the data item is deployed, and
        appending the unique node identifier to the atomically modified local counter value at the node of the networked environment where the first instance of the data item is deployed to form a unique ID for the data item.

2. The method of claim 1, wherein the redundancy check is performed for a failover operation, the first node is a failing node, and the second node is a substitute node.

3. The method of claim 1, wherein the redundancy check is performed for a failback operation, the first node is a substitute node, and the second node is a recovered node.

4. The method of claim 1, wherein the data item residing at the first node is a subsequent instance of the data item.

5. The method of claim 1, wherein the unique node identifier is determined using a global counter for the networked environment, such that a value of the global counter is atomically modified each time a new node is introduced to the networked environment.

6. The method of claim 1, wherein the unique node identifier is a 64-bit value and the local counter value is a 64-bit value.

7. The method of claim 1, wherein the data item is immutable after the unique ID for the first instance of the data item has been formed.

8. The method of claim 1, wherein any identical instance of the data item in the networked environment is associated with the unique ID and a modified instance of the data item is associated with a different unique ID.

9. A computer program product comprising a non-transitory computer usable medium having executable code to execute a method for performing a redundancy check for a data item residing at a first node to be replicated or migrated in a networked environment, comprising:
    determining a unique ID for the data item;
    identifying a second node in the networked environment where the data item is to be replicated;
    comparing the unique ID for the data item to be replicated or migrated with a list of unique IDs residing at the second node;
    replicating or migrating the data item at the second node if the unique ID for the data item is not in the list of unique IDs residing at the second node; and
    wherein the unique ID is assigned to a first instance of the data item by:
        determining a unique node identifier for a node of the networked environment where the first instance of the data item is deployed,
        atomically modifying a local counter value at the node of the networked environment where the first instance of the data item is deployed, and
        appending the unique node identifier to the atomically modified local counter value at the node of the networked environment where the first instance of the data item is deployed to form a unique ID for the data item.

10. A system for performing a redundancy check for a data item residing at a first node to be replicated or migrated in a networked environment, comprising:
    a processor for:
    determining a unique ID for the data item;
    identifying a second node in the networked environment where the data item is to be replicated or migrated;

comparing the unique ID for the data item to be replicated or migrated with a list of unique IDs residing at the second node;

replicating or migrating an instance of the data item at the second node if the unique ID for the data item is not in the list of unique IDs residing at the second node; and wherein the unique ID is assigned to a first instance of the data item by:

determining a unique node identifier for a node of the networked environment where the first instance of the data item is deployed, atomically modifying a local counter value at the node of the networked environment where the first instance of the data item is deployed, and appending the unique node identifier to the atomically modified local counter value at the node of the networked environment where the first instance of the data item is deployed to form a unique ID for the data item.

11. The computer program product of claim 9, wherein the unique node identifier is determined using a global counter for the networked environment, such that a value of the global counter is atomically modified each time a new node is introduced to the networked environment.

12. The computer program product of claim 9, wherein the data item is immutable after the unique ID for the first instance of the data item has been formed.

13. The computer program product of claim 9, wherein any identical instance of the data item in the networked environment is associated with the unique ID and a modified instance of the data item is associated with a different unique ID.

14. The computer program product of claim 9, wherein the redundancy check is performed for a failover operation and the first node is a failing node and the second node is a substitute node.

15. The computer program product of claim 9, wherein the redundancy check is performed for a failback operation and the first node is a substitute node and the second node is a recovered node.

16. The system of claim 10, wherein the unique node identifier is determined using a global counter for the networked environment, such that a value of the global counter is atomically modified each time a new node is introduced to the networked environment.

17. The system of claim 10, wherein the data item is immutable after the unique ID for the first instance of the data item has been formed.

18. The system of claim 10, wherein any identical instance of the data item in the networked environment is associated with the unique ID and a modified instance of the data item is associated with a different unique ID.

19. The system of claim 10, wherein the redundancy check is performed for a failover operation and the first node is a failing node and the second node is a substitute node.

20. The system of claim 10, wherein the redundancy check is performed for a failback operation and the first node is a substitute node and the second node is a recovered node.

* * * * *